US012584776B2

(12) United States Patent
    Schwenter et al.

(10) Patent No.: US 12,584,776 B2
(45) Date of Patent: Mar. 24, 2026

(54) PROCESS MONITORING DEVICE

(71) Applicant: Endress+Hauser Flowtec AG, Reinach (CH)

(72) Inventors: Benjamin Schwenter, Ettingen (CH); Ennio Bitto, Aesch (CH); Marc Werner, Grenzach-Wyhlen (DE)

(73) Assignee: Endress+Hauser Flowtec AG, Reinach (CH)

( * ) Notice: Subject to any disclaimer, the term of this patent is extended or adjusted under 35 U.S.C. 154(b) by 391 days.

(21) Appl. No.: 18/258,167

(22) PCT Filed: Nov. 26, 2021

(86) PCT No.: PCT/EP2021/083209
    § 371 (c)(1),
    (2) Date: Jun. 16, 2023

(87) PCT Pub. No.: WO2022/128415
    PCT Pub. Date: Jun. 23, 2022

(65) Prior Publication Data
    US 2024/0053182 A1     Feb. 15, 2024

(30) Foreign Application Priority Data
    Dec. 16, 2020    (DE) ...................... 10 2020 133 851.1

(51) Int. Cl.
    *G01F 1/84*          (2006.01)
(52) U.S. Cl.
    CPC .......... *G01F 1/8413* (2013.01); *G01F 1/8477* (2013.01)
(58) Field of Classification Search
    CPC ............................. G01F 1/8413; G01F 1/8477

USPC ....................................................... 73/861.355
    See application file for complete search history.

(56) References Cited

U.S. PATENT DOCUMENTS

| 4,957,005 | A | 9/1990 | Yard et al. |
| 6,773,678 | B2 | 8/2004 | Cummings et al. |
| 8,601,884 | B2 * | 12/2013 | Hussain ................ G01F 1/8477 |
| | | | 73/861.355 |

(Continued)

FOREIGN PATENT DOCUMENTS

| CN | 110747850 A | 2/2020 |
| DE | 3833227 A1 | 4/1990 |

(Continued)

*Primary Examiner* — Peter J Macchiarolo
*Assistant Examiner* — Rodney T Frank
(74) *Attorney, Agent, or Firm* — Christopher R. Powers; Endress+Hauser (USA) Holding, Inc.

(57)                    ABSTRACT

A process monitoring device includes: a measuring tube arrangement including a measuring tube; a receptacle module including a receptacle, wherein the measuring tube module is insertable into the receptacle and releasably mechanically connectable to the receptacle module; and a system for biotechnological applications, wherein the system includes a housing with a wall delimiting an interior, the wall having a cover with an opening, wherein the receptacle extends through the opening into the interior in a receiving direction, wherein the receptacle module is arranged in the opening that the receiving direction has a vector component opposite to the direction of gravity, such that a dead volume in the measuring tube and/or in a distributor piece which is attached to the measuring tube, when the measuring tube module is empty, is less than 20%.

21 Claims, 4 Drawing Sheets

(56)             References Cited

U.S. PATENT DOCUMENTS

| | | | |
|---|---|---|---|
| 9,194,731 B2* | 11/2015 | Chatzikonstantinou ..................... G01F 15/02 | |
| 10,209,113 B2 | 2/2019 | Young et al. | |
| 2003/0097881 A1* | 5/2003 | Schlosser ................ G01F 1/849 73/861.355 | |
| 2004/0045369 A1* | 3/2004 | Bitto ..................... G01F 1/8413 73/861.18 | |
| 2007/0119121 A1 | 5/2007 | Woods et al. | |
| 2010/0154563 A1 | 6/2010 | Pankratz et al. | |
| 2015/0377672 A1* | 12/2015 | Wang .................... G01F 1/8472 73/861.357 | |
| 2016/0298068 A1 | 10/2016 | Schumacher et al. | |
| 2019/0309255 A1 | 10/2019 | Ott et al. | |

FOREIGN PATENT DOCUMENTS

| | | | |
|---|---|---|---|
| DE | 4312080 | A1 | 10/1994 |
| DE | 102006013826 | A1 | 9/2007 |
| DE | 102015122146 | A1 | 6/2017 |
| DE | 102016008655 | A1 | 1/2018 |
| DE | 102017128565 | A1 | 6/2019 |
| DE | 102019134604 | A1 | 6/2021 |
| EP | 0601256 | A1 | 6/1994 |
| EP | 1136818 | A2 | 9/2001 |
| EP | 1954565 | A1 | 8/2008 |
| WO | 2011099989 | A1 | 8/2011 |
| WO | 2018114755 | A1 | 6/2018 |

* cited by examiner

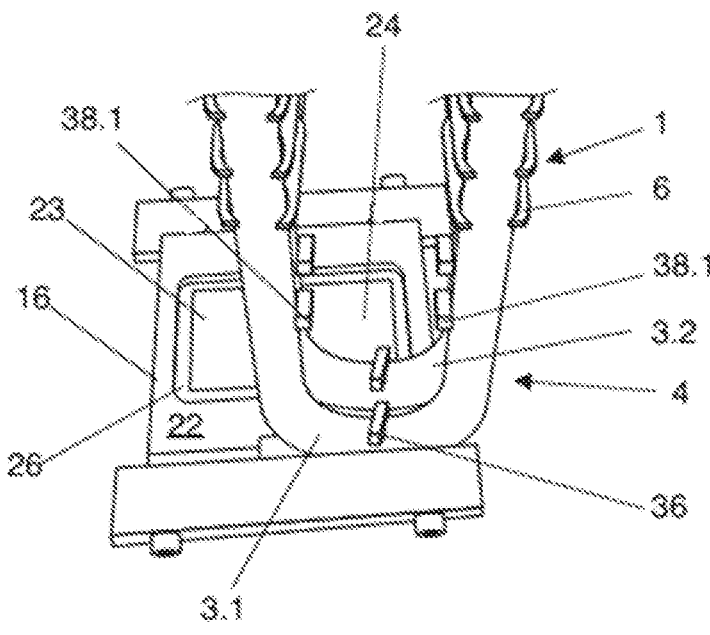
Fig. 2A
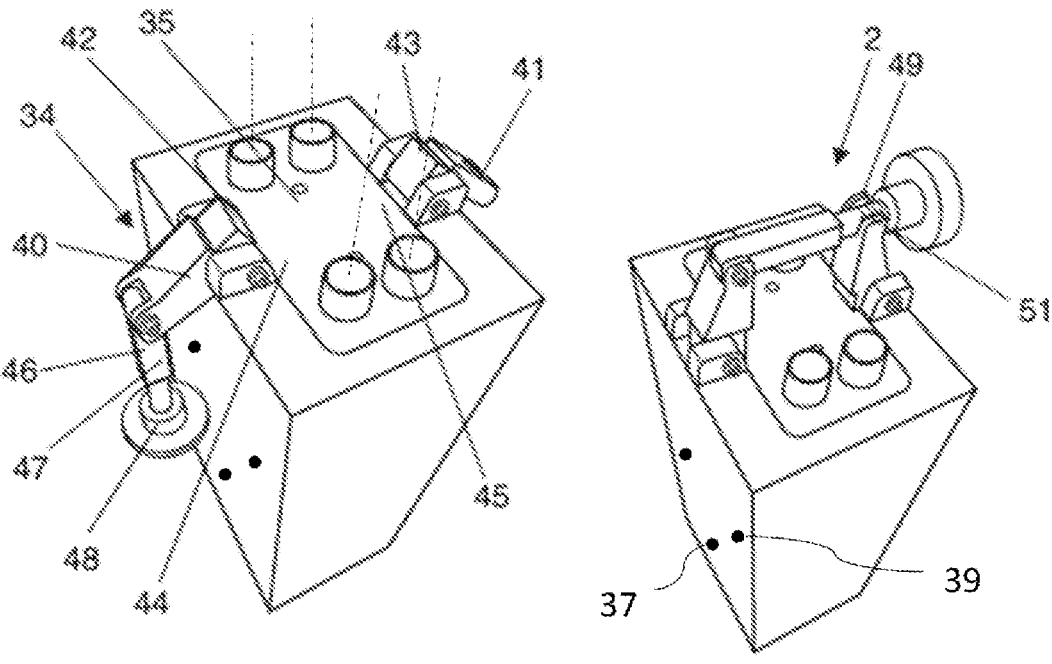
Fig. 2B　　　　　　　　　　Fig. 2C

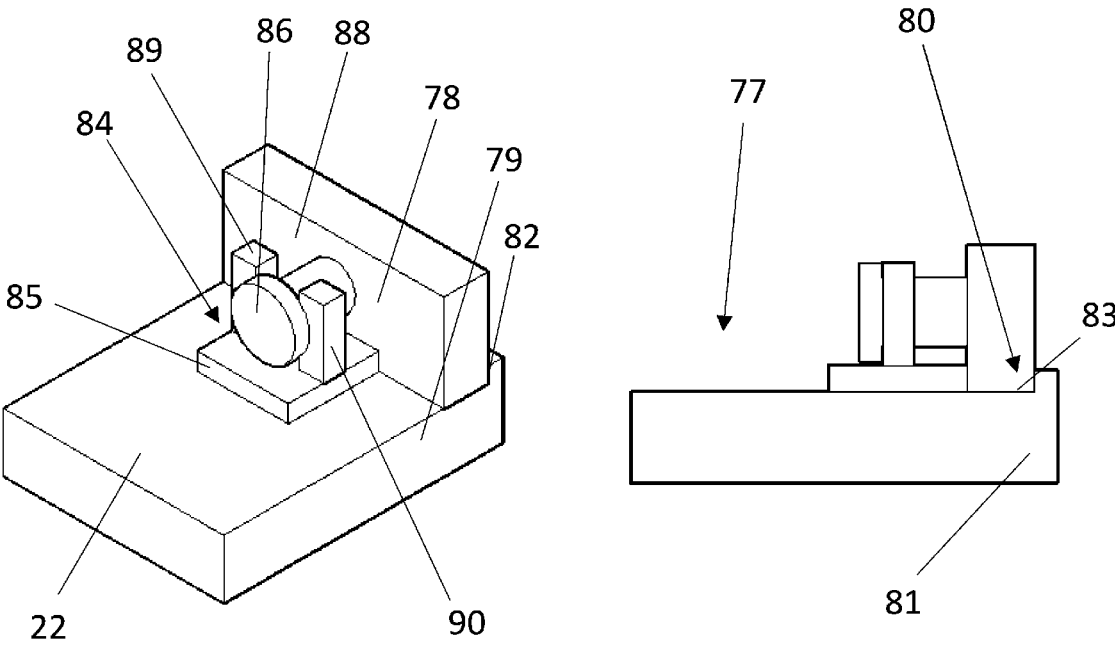
Fig. 3A             Fig. 3B
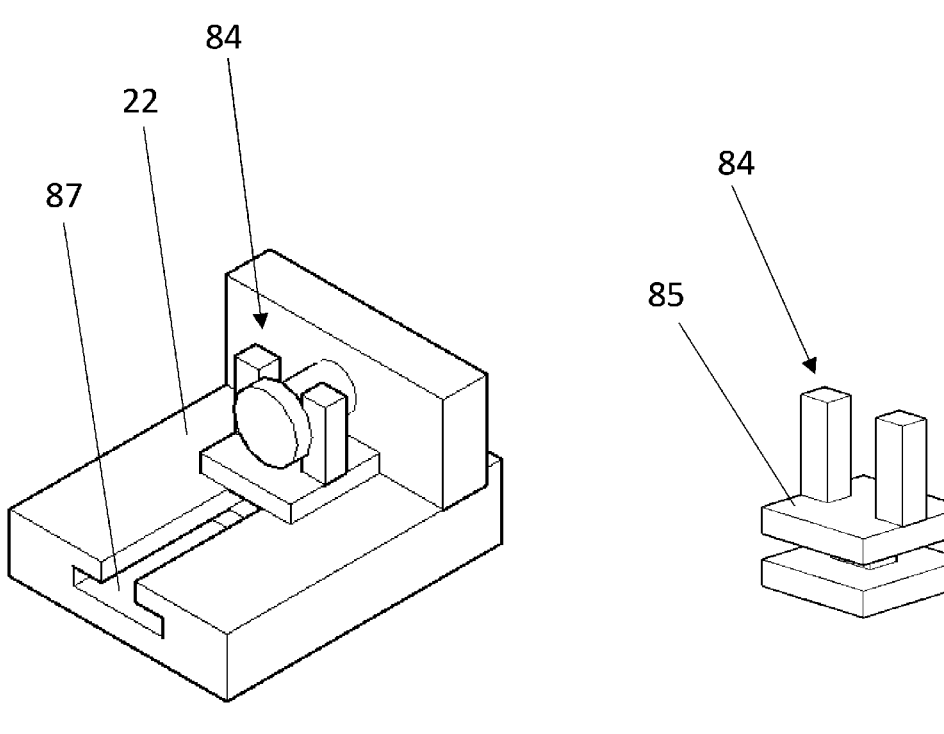
Fig. 4             Fig. 5

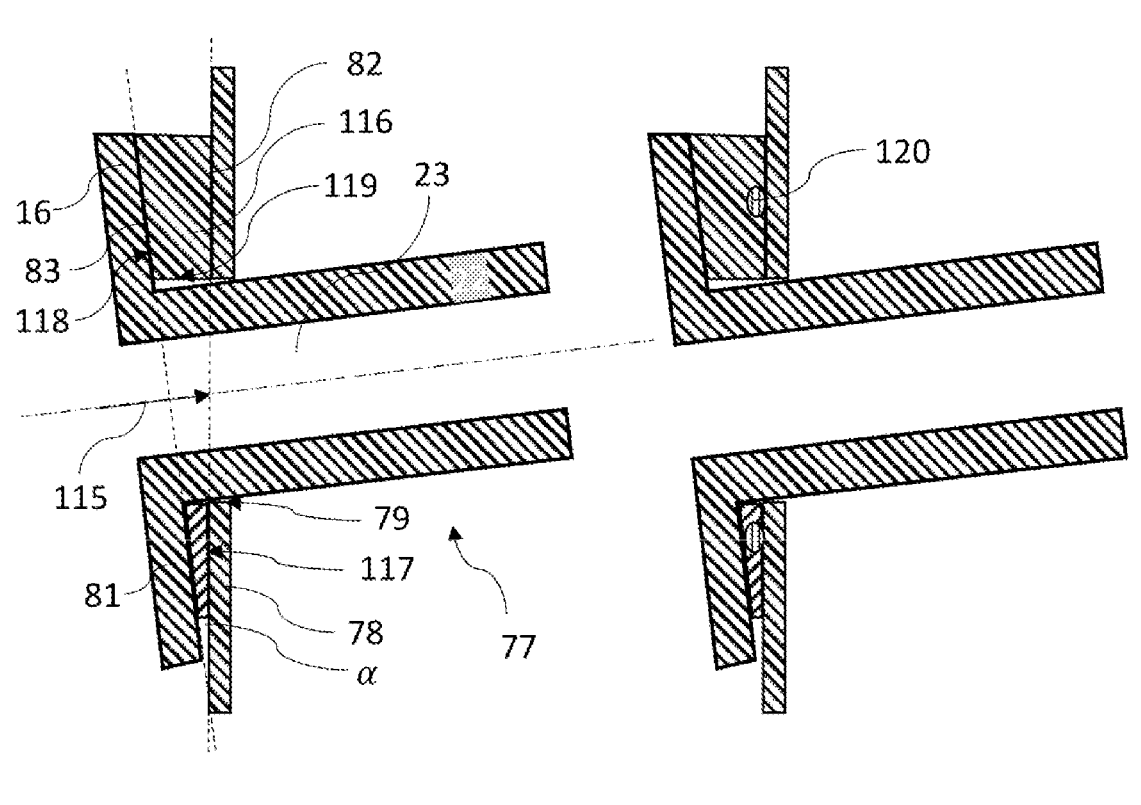
Fig. 6A                                              Fig. 6B
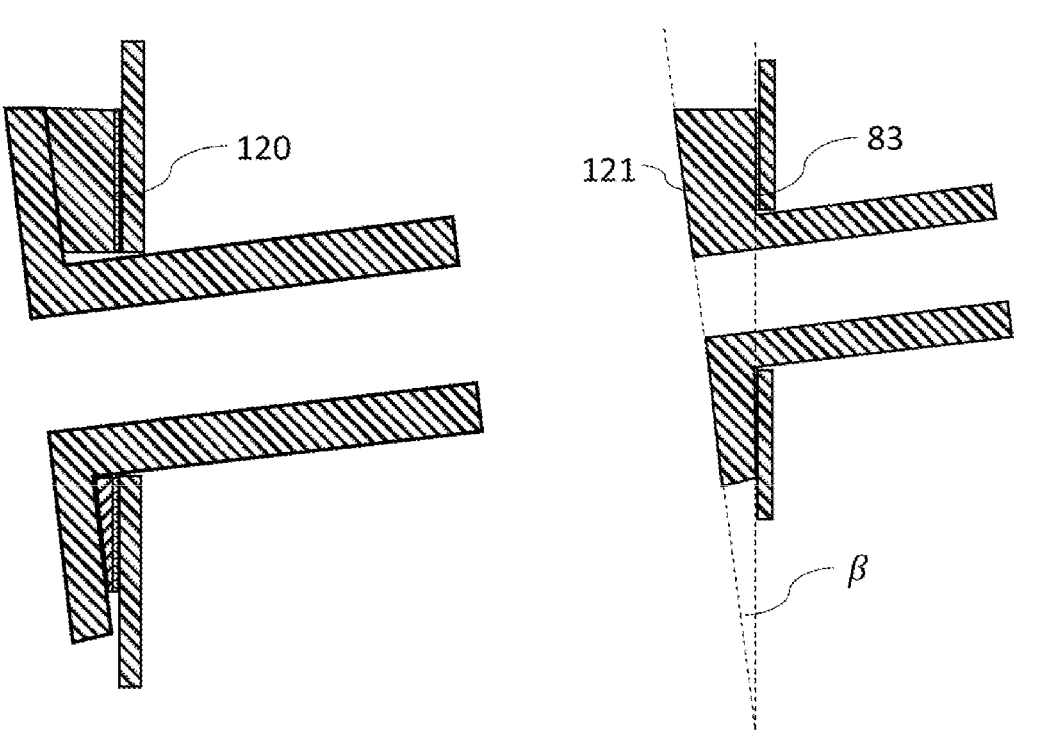
Fig. 6C                                              Fig. 6D

PROCESS MONITORING DEVICE

CROSS-REFERENCE TO RELATED APPLICATIONS

The present application is related to and claims the priority benefit of German Patent Application No. 10 2020 133 851.1, filed on Dec. 16, 2020, and International Patent Application No. PCT/EP2021/083209, filed Nov. 26, 2021, the entire contents of which are incorporated herein by reference.

TECHNICAL FIELD

The invention relates to a process monitoring device, preferably for pharmaceutical bioprocessing applications.

BACKGROUND

Systems for bioprocessing applications—examples thereof are bioreactors or crossflow systems—serve the purpose of receiving, storing and/or mixing biological medium which comprise fluids and/or solids. The biological media are usually provided in disposable containers and/or bags, and are placed into a housing of the system for bioprocessing applications, where they are stored, brought to a specific temperature, and/or mixed. In such a system for bioprocessing applications, the process properties of the biological medium are investigated and/or monitored with different sensors. One or more sensors can be arranged in the system for bioprocessing applications to carry out measurements on the medium in the disposable container or in the hose system—such as temperature or pH measurements. In this case, the sensor is arranged on an outer surface of the housing of the system for bioprocessing applications in such a way that a portion of the sensor which contacts the medium passes into the container and into the medium through the housing wall of the system for bioprocessing applications. Alternatively, the sensors can be integrated into a hose system which is designed to remove the medium from the container. This hose system is usually arranged on the outer surface of the housing. The handling of the system for bioprocessing applications takes place in a sterile environment or under clean room conditions.

DE 10 2016 008 655 A1 discloses a system for biotechnological applications, in particular a bioreactor, which has system rails or beams on the peripheral surface of the housing for the purpose of attaching hoses and sensors to the outside of the housing. Furthermore, triclamps are disclosed as fastening means.

Coriolis flow meters are typically used in process-automated industrial systems in conduits, via connecting devices such as flanges, connectors, etc. An example of this is a filling station for liquid or gaseous substances as disclosed in DE 10 2006 013 826 A1, or a process line as disclosed in DE 10 2017 128 565 A1.

Coriolis flow meters with interchangeable disposable measuring tube modules, which are suitable for single-use applications in process monitoring devices, are also known. For example, WO 2011 099 989 A1 teaches a method for producing a monolithically formed measuring tube module of a Coriolis flow meter, having bent measuring tubes, wherein the measuring tube body of the respective measuring tubes is at first formed as a solid made of a polymer, and the channel for conveying the flowing medium is subsequently machined into said solid. WO 2011 099 989 A1 teaches, similarly to U.S. Pat. No. 10,209,113 B2, a modular design of the Coriolis flow meter, making possible an exchange of the part of the measuring device contacting the medium. To this date, nothing is known regarding the integration of the Coriolis flow meter into process monitoring systems for pharmaceutical bioprocessing applications.

SUMMARY

The invention is based on the object of providing a process monitoring device which ensures self-emptying of the replaceable measuring tubes.

The object is achieved by the process monitoring device according to the present disclosure.

The process monitoring device according to the invention, preferably for pharmaceutical bioprocessing applications, comprising:

a measuring tube module,
  wherein the measuring tube module comprises at least one measuring tube through which a medium can flow;

a receptacle module,
  wherein the receptacle module has a receptacle module body which at least partially delimits a receptacle,
  wherein the measuring tube module can be inserted into the receptacle,
  wherein the measuring tube module is mechanically connectable to the receptacle module in a manner allowing release; and a system particularly for biotechnological applications,
  wherein the system has a housing,
  the housing having a housing wall, in particular formed from sheet metal, which delimits a housing interior,
  wherein the housing wall has a cover,
  wherein the cover has a cover opening,
  wherein the receptacle module, in particular the receptacle, extends through the cover opening into the housing interior.
  wherein the receptacle extends in a receiving direction,
  wherein the receptacle module is arranged in the cover opening in such a manner that the receiving direction has a vectorial portion with a direction opposite to the direction of gravity,
  wherein the receptacle module is arranged in the cover opening such that a dead volume in the at least one measuring tube and/or in a distributor piece attached to the at least one measuring tube, when the measuring tube module is emptied, is less than 20%, in particular less than 10%, and preferably less than 5%.

A dead volume is intended to mean a volume in which medium accumulates after interruption of a flow and emptying of the measuring tube.

Advantageous embodiments are the further subject matter of the present disclosure.

In one embodiment, the receptacle module comprises a portion,
  wherein the portion is located outside the housing interior,
  wherein the receptacle module, in the portion, has in particular a circumferential shoulder,
  wherein the cover has a cover surface,
  wherein the shoulder has a shoulder surface,
  wherein the shoulder surface and the cover surface face each other.
  wherein an inclination body is clamped between the shoulder surface and the cover surface,
  wherein the inclination body, which is in particular acute-angled, is wedge-shaped.

The use of an inclination body has the advantage of making possible a simple assembly of the receptacle module on the system, and making self-emptying possible to a certain degree. Existing systems can thus also be easily retrofitted. The clamping of the inclination body has an advantage over known connections connected in a material-bonded manner (see EP 1 136 818 B1), in that the attachment is significantly simplified, and it is possible to arrange the configuration on particularly thin-walled covers made of sheet metal, without mechanical stress being introduced into the housing wall. For this purpose, a fastening device can advantageously be arranged in the housing interior for a positive or non-positive connection of the receptacle module to the housing wall.

One embodiment provides that the inclination body has a first lateral surface in which a first lateral surface plane extends, wherein the inclination body has a second lateral surface in which a second lateral surface plane extends, wherein the first lateral surface plane and the second lateral surface plane are at an angle $\alpha$ of 0.1° to 15°, in particular 0.2° to 10° and preferably 0.5° to 7°.

One embodiment provides that the inclination body has an inclination body opening, wherein the receptacle module extends at least partially through the inclination body opening.

One embodiment provides that the inclination body is designed as a sealing means, in particular made of an EPDM building material for the purpose of sealing the housing interior against liquids.

This has the particular advantage that an additional sealing means (such as, for example, an o-ring, sealing disk) can be dispensed with. The inclination body, which is designed to ensure an inclined arrangement of the measuring tube module in the receptacle, thus likewise fulfills the sealing properties of a sealing means. The sealing means falls under the protected classifications IP00 to IP6K9K (ISO 20653).

One embodiment provides that the inclination body has an inclination body receptacle for a sealing means, wherein the sealing means is arranged in the inclination body receptacle.

One embodiment provides that a disk-shaped sealing means is arranged between the inclination body and the cover surface.

One embodiment provides that the inclination body assumes a basic shape of a particularly-rectangular trapezoid in a longitudinal section.

The rectangular trapezoid has two parallel sides. The shorter side has a minimum length of 3 mm and the longer side has a maximum length of 45 mm. The respective lengths of the two parallel sides are preferably selected such that a sufficient inclination for self-emptying is produced, and at the same time a spacing of the hose system (in which the medium which will be conveyed in the measuring tube module is fed in and discharged) that is specified for the process applications is fulfilled.

One embodiment provides that the inclination body has a rectangular basic shape with a rectangular cutout formed by the inclination opening.

In one embodiment, the receptacle module comprises a portion, wherein the portion is located outside the housing interior, wherein the receptacle module, in the portion, has in particular a circumferential shoulder, wherein the cover has a cover surface, wherein the shoulder has a shoulder surface, wherein the shoulder surface and the cover surface face each other and extend parallel to each other, wherein a shoulder plane running on the shoulder surface and an end face plane running on an end face intersect at an angle $\beta$ of 0.1° to 15°, in particular 0.2° to 10°, and preferably 0.5° to 7°.

This embodiment has the advantage that no further inclination body need be provided during the arrangement, since its function is already replaced by the shaping of the shoulder.

In one embodiment, the receptacle module comprises a fastening arrangement, wherein the fastening arrangement is arranged in the housing interior, wherein the fastening arrangement is configured to connect the receptacle module to the cover, in particular in a mechanically releasable manner.

The advantage of the embodiment is that better cleanability from outside the housing is ensured if the fastening arrangement is located exclusively in the housing interior. No further openings in the cover means fewer places where moisture can enter the housing interior.

In one embodiment, the system comprises a bioreactor or a system for chromatographic purification processes.

A bioreactor and/or fermentation reactor is a vessel in which biological processes run, and/or certain cultures are cultured in a medium, under controlled conditions defined in advance. The use of a bioreactor is an important part of pharmaceutical bioprocess technology. The vessels can be arranged in a housing, and the process properties of the medium can be monitored by means of sensors.

The term chromatography is used to mean a process which allows the separation of a substance mixture utilizing the differential distribution of its individual constituents between a stationary and a mobile phase. Chromatography is used, for example, during production for the purpose of purifying substances—in particular, in the production of biopharmaceuticals. Crossflow filtration is a further method for filtering media.

In one embodiment, the measuring tube module has a first vibration exciting component of at least one vibration exciter, designed to excite vibrations in the measuring tube module—in particular, the at least one measuring tube— wherein the measuring tube module has a first vibration sensor component of at least one vibration sensor, designed to detect the vibrations of the at least one measuring tube, wherein the receptacle module has a second vibration exciting component of the at least one vibration exciter, wherein the receptacle module has a second vibration sensor component of the at least one vibration sensor.

The division of the vibration sensor components and the vibration exciting components on the measuring tube module and the receptacle module has the advantage that only a portion of the vibration sensor components and vibration exciting components is changed when the measuring tube module is replaced. The vibration sensor components and vibration exciting components, which are arranged on the receptacle module, can thus be used for a plurality of measurement runs. If the measuring tube module is a single-use/disposable part, the quantity of electronic or magnetic rejects is reduced at the same time.

In one embodiment, at least the measuring tube module and the receptacle module form a modular Coriolis flow meter.

Coriolis flow meters are known to have very high measurement accuracy and can provide information on the viscosity and the density—in addition to mass flow—of the medium being conveyed. This is not possible with conventional weight scales.

BRIEF DESCRIPTION OF THE DRAWINGS

The invention is explained in greater detail with reference to the following figures. The following are shown:

FIGS. 2A-2C show three views, respectively, of a measuring tube and receptacle module according to the present disclosure;

FIGS. 3A and 3B show a partially cutaway interior view of the process monitoring device, having a first embodiment of the fastening arrangement, and a side view of the first embodiment of the fastening arrangement, respectively;

FIG. 4 shows a partially cutaway interior view of the process monitoring device, having a second embodiment of the fastening arrangement;

FIG. 5 shows a side view of the first fastening means of the second embodiment of the fastening arrangement; and FIGS. 6A-6D each show a longitudinal section through an embodiment of the inclination body according to the present disclosure.

DETAILED DESCRIPTION

Figure 1:
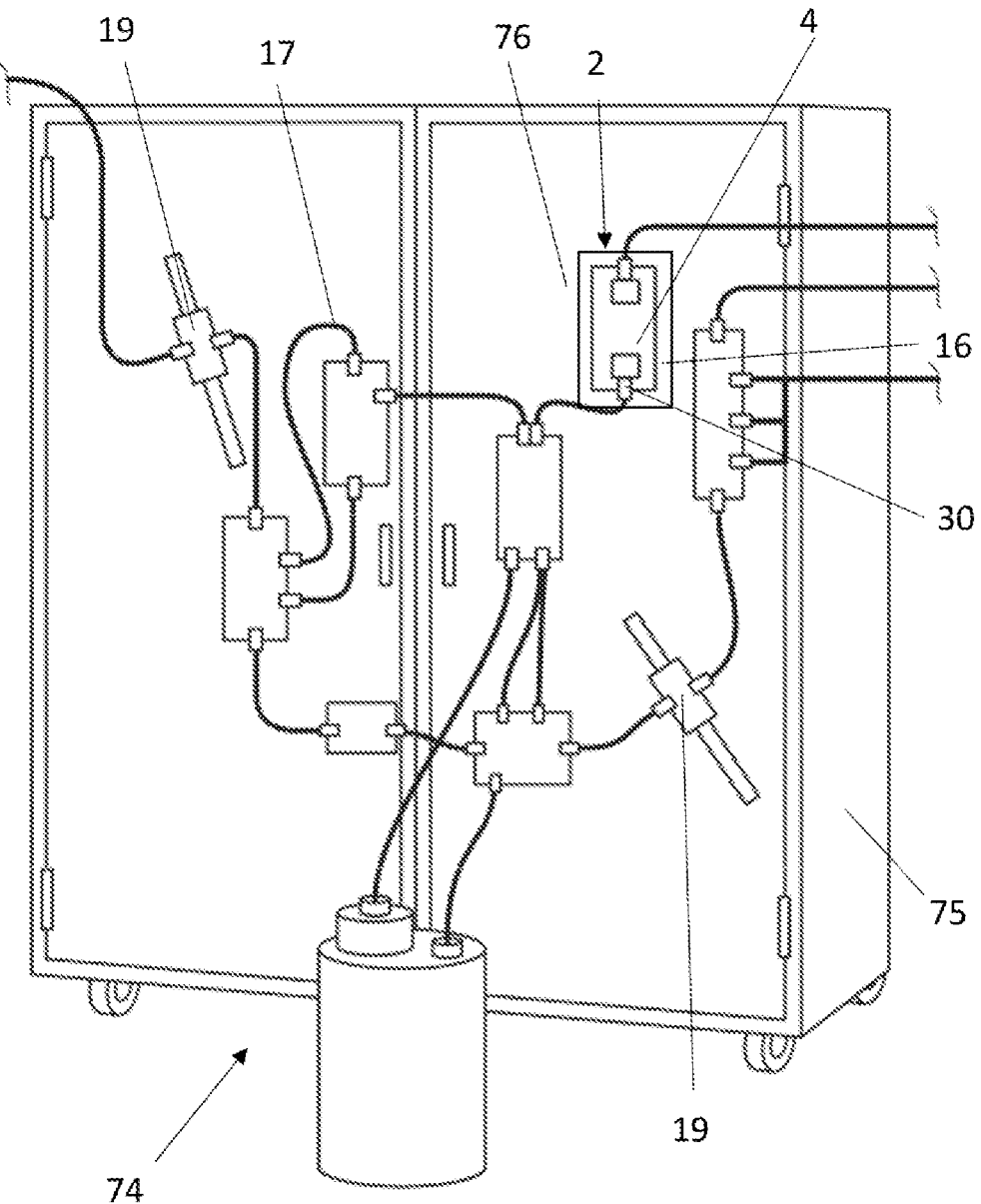
FIG. 1 shows a process monitoring device according to the present disclosure.

FIG. 1 shows a process monitoring device according to the invention for pharmaceutical bioprocessing applications in a system for biotechnological applications 74. A measuring tube module 4 and a receptacle module 16 together form a Coriolis flow meter 2. The measuring tube module 4 has at least one measuring tube 3 through which a medium can flow, and is configured as an exchangeable component of the Coriolis flow meter 2. For this purpose, it preferably has no electronic components which have to be supplied with a voltage source via an electrical contact. The measuring tube module 4 has a first vibration exciting component of at least one vibration exciter, designed to excite vibrations in the measuring tube module 4, in particular the at least one measuring tube 3. In addition, the measuring tube module 4 has a first vibration sensor component of at least one vibration sensor, designed to detect the vibrations of the at least one measuring tube 3. The first vibration exciting component and the first vibration sensor component are preferably magnets. Furthermore, the measuring tube module 4 has process connections 30 which are both designed as distributor pieces.

The receptacle module 16 is a fixed component of the system for biotechnological applications 74, and has the electronic components with which the Coriolis flow meter 2 is operated and the flow-dependent measurement signal is detected. The receptacle module 16 has a receptacle 23 for the measuring tube module 4, into which the measuring tube module 4 can be inserted. In addition, the measuring tube module 4 is mechanically connectable to the receptacle module 16 in a manner allowing release and/or separation, in order to ensure a user-friendly exchange of the measuring tube module 4. When the application is changed, the measuring tube module 4 can be replaced with a new sterilized measuring tube module 4. The receptacle module 16 has a second vibration exciting component of the at least one vibration exciter and a second vibration sensor component of the at least one vibration sensor. These are the excitation coil and the at least one sensor coil, which are each electrically connected to a measuring circuit and are controlled or read, respectively, via the circuit. The receptacle module 16 is not designed to touch the medium; rather, it is designed so that it can be cleaned.

The system 74 for biotechnological applications has a housing 75 with a housing wall 76 which delimits a housing interior. The housing wall 76 is made of sheet metal. The receptacle module 16 is arranged in a cover opening of the housing wall 76. The receptacle module 16, in particular the receptacle of the receptacle module 16, extends through the cover opening 79 into the housing interior. The receptacle module 16 is fastened through the housing interior (see FIG. 3-6). The receptacle module 23 can be arranged in the cover opening 79 in such a way that the receiving direction, which is defined by the direction of the extension of the receptacle module, has a vectorial portion with a direction opposite to the direction of gravity. The system 74 can comprise a bioreactor, a system for chromatographic purification processes, a crossflow system, or the like.

FIGS. 2A-2C are an image series of individual assembly steps of a measuring device 2 according to the invention. The measuring tube module 4 comprises two measuring tubes 3.1, 3.2, which are mechanically coupled to one another via a coupler arrangement 1. In the illustrated embodiment, the coupler arrangement 1 comprises six coupler elements 6, which partially encompass the two measuring tubes 3.1, 3.2. The measuring tube module 4 is designed as a disposable article, and can be arranged in and fastened to a provided receptacle module 16 in a manner allowing mechanical separation. The two measuring tubes 3.1, 3.2 each comprise a measuring tube body, which is formed at least partially from steel. An excitation magnet 36 and two sensor magnets 38.1, 38.2 are attached to each of the measuring tube bodies. The receptacle module 16 has a receptacle 23 which extends from an end face of the receptacle module body 22 in the longitudinal direction thereof. In addition, the receptacle module body 22 of the receptacle module 16 has a mounting surface 26 on which the measuring tube module 4, in particular the fixing body arrangement 35, rests in the installed state, and which is designed such that the measuring tubes 3.1, 3.2 of the measuring tube module 4 do not touch the wall of the receptacle module 16. The mounting surface 26 surrounds the receptacle 29 in a cross section, so that when the measuring tube module 4 is arranged, an entire edge region of the fixing body arrangement 35 rests on the mounting surface 26. The two excitation coils of the vibration exciter and the four sensor coils of the vibration sensor (not shown) are arranged in an inner peripheral surface of the receptacle module 16, in particular distributed on two diametrically oriented lateral surfaces of the receptacle 23. The excitation coils and vibration coils are preferably embedded in the receptacle module body 22, such that they are not damaged when the measuring tube module 4 is inserted.

In the installed state, the measuring tube module 4 is arranged in the receptacle 23, and the fixing body arrangement 35 rests on the mounting surface 26. The measuring tube module 4 is now ready to be fastened to the receptacle module 16 by means of the fixing device 34. This is necessary so that a measurement with a stable zero point is possible. For this purpose, the fixing device 34 has a first fixing element 40 and a second fixing element 41, which are each designed to be pivotable and each have a fixing surface 42, 43. The fixing surfaces 42, 43 are each located at a first end of the fixing element 40, 41. The fixing elements 40, 41 each have an elongate fixing element body. In the end portion comprising the first end, the fixing elements 40, 41 are fastened to the receptacle module body 22 in a manner allowing pivoting about an axis of rotation. The fixing elements 40, 41 are designed to press the fixing body arrangement 44 against the mounting surface 26 in order to thus suppress movements of the fixing body arrangement. The first fixing element 40 is connected to a pivotable connecting device 46, which comprises a connecting body 47. The connection between the fixing element 40 and the pivotable connecting device 46 is located at the second end of the first fixing element 40. The connecting body 47 is at least partially cubic, and cylindrical in the end portion. There, a closing device 48 is arranged on the connecting body 47. In the illustrated embodiment, the end portion of the connecting body 47 has an external thread, and the closing device 48 is designed as a screw. Depending on the application and the requirements for measurement perfor-mance, the closing device 48 can also be designed as a torque screw, a clamping lever, a clamp lever, a tensioning bracket, a clamp, a tensioning lever, a clamping claw, a hood closure, and/or an eccentric lever. Alternatively (not shown), the closing device 48 can be designed as a clasp, in particular a sleeve clasp, which is arranged on a first fixing element 40 of the two fixing elements 40, 41. Accordingly, a pivot part is arranged on the second fixing element 41. In this case, the pivot part is designed as a sleeve pivot part which has at least one hook, in particular a sleeve hook. In the fixed state, the fixing surfaces 42, 43 of the fixing elements 40, 41 contact the support surfaces 44, 45 of the fixing body arrangement 35. The connecting body 47 of the connecting device 46 has a functional connection to the second fixing element 41—that is, the connecting device 46, in particular the connecting body 47, connects the first fixing element 40 to the second fixing element 41. The second fixing element 41 has a guide 51 at the second end for the end portion of the connecting body 47. In the closed state, the connecting body 47 extends along the guide 51 of the second fixing element 41. The closing device 48 contacts the clamping surface 49 of the second fixing element 41. When the closing device 48, in the form of a screw, is tightened, the two fixing elements are brought uniformly together. The closing device 48 presses against the clamping surface 49. Because the two fixing elements 40, 41 are designed to be pivotable about an axis of rotation, when the fixing elements 40, 41 are tight-ened and accordingly brought together, a force is produced on the fixing body arrangement 35 parallel to the longitu-dinal direction of the measuring tube module 4 in the direction of the mounting surface 26. This force ensures a uniform fastening of the measuring tube module 4 to the carrier unit body 22. The measuring tubes 3.1, 3.2 each have an inlet longitudinal axis in the inlet portion and an outlet longitudinal axis in the outlet portion, wherein a first lon-gitudinal plane runs through the inlet longitudinal axes of the measuring tubes, wherein a second longitudinal plane runs through the outlet longitudinal axes of the measuring tubes, wherein the fixing body arrangement 35 has a second end face which is oriented opposite to the first end face, wherein the first longitudinal plane and the second longitu-dinal plane define a first surface on the second end face of the fixing body arrangement 35, wherein the inlet longitu-dinal axis and the outlet longitudinal axis of the first mea-suring tube 3.1 extend in a third longitudinal plane, wherein the inlet longitudinal axis and the outlet longitudinal axis of the second measuring tube 3.2 extend in a fourth longitu-dinal plane, wherein the third longitudinal plane and the fourth longitudinal plane delimit a second surface on the second end face, wherein the fixing surfaces 42, 43 of the fixing elements 40, 41 in particular lie exclusively on the first surface in the fastening state, and lie outside the second surface. Alternatively, the fixing body arrangement 35 can be formed in multiple parts, wherein one part is materially bonded to the at least one measuring tube 3.1, 3.2, and a further part is attached at least with a positive connection. This further part is designed and configured as a process connection for the measuring tubes 3.1, 3.2 to a process line. For this purpose, the further part can have, for example, standardized process connections, such as flanges or threads.

FIGS. 3A and 3B show a partially cutaway interior view of the process monitoring device, with a first embodiment of the fastening arrangement 84 for fastening the receptacle module 16 to the housing wall, in particular to the cover 78, and a side view of the first embodiment of the fastening arrangement 84, respectively. An opening 79 in which the receptacle module 16 is arranged is incorporated in the cover 78. The receptacle module 16, in particular the receptacle 23, extends through the opening 79 into the housing interior 77 of the housing. In addition to the receptacle module 16, pumps, fans, cables, hoses, electronic components, and containers for the medium can be located in the housing interior 77. Furthermore, in the receiving portion 80, the receptacle module 16 has a particularly circumferential shoulder 81 with a shoulder surface 83. A cover surface 82 of the cover 78 and the shoulder surface 83 face one another and lie on one another in the installed state. The shoulder is shown schematically and is generally significantly thicker than the cover 78. The fastening is realized by means of a fastening arrangement 84 which is arranged in the housing interior 77. The fastening arrangement 84 is designed to mechanically connect the receptacle module 16 to the cover 78. For this purpose, it has a first fastening means 85 and a second fastening means 86. The first fastening means 85 is connected to the receptacle module 16 and the second fastening means 86 is connected to the first fastening means 85, such that they functionally connected to one another. The rear side 88 of the cover 78 is in contact with the second fastening means 86, which is designed to bend the first fastening means 85 at least partially, preferably opposite the rear side 88. For this purpose, the first fastening means 85 has a first leg 89 and a second leg 90, which extend substantially parallel to one another and are spaced apart. In the illustrated embodiment, the second fastening means 86 comprises a screw which extends between the first leg 89 and the second leg 90 in a threaded opening. According to the embodiment shown, the first fastening means 85 is fastened to the receptacle module body 22 by means of a screw. As an alternative to the two legs, a single plate with a blind hole and a threading can also be provided. The receptacle module body 22 preferably comprises steel.

FIG. 4 shows a partially cutaway interior view of the process monitoring device, with a second embodiment of the fastening arrangement 84. The second embodiment differs from the first embodiment substantially by the additional guide 87 which is incorporated in the receptacle module body 22. The shape of the first fastening means 85 allows the fastening arrangement 84 to be arranged in a movable way in the longitudinal direction of the receptacle module 16. The guide 87 is designed as a T-shaped groove, and the body of the first fastening means 85 is designed to be comple-mentary in sections thereto (see FIG. 5). The first fastening means 85 can likewise be connected to the receptacle module body 22 with a positive and/or non-positive con-nection via a screw. In this case, no openings with threads need be provided in the receptacle module body 22. Instead, the first fastening means 85 can be clamped in the guide by clamping the base body.

FIG. 5 shows a perspective view of the first fastening means 85 of the second embodiment of the fastening arrangement 84. In a cross section, the first fastening means 85 has a T-shaped basic shape, at least in one end portion. This is designed to be complementary to the shape of the guide. The base body of the first fastening means 85 preferably comprises steel.

FIGS. 6A to 6D each show a cross section through a process monitoring device, in particular a longitudinal section of the inclination body 116 according to the invention. FIG. 6A shows a process monitoring device which is preferably suitable for pharmaceutical bioprocessing applications, and a measuring tube module (not shown) with at least one measuring tube through which a medium can flow, and a receptacle module 16 with a receptacle module body 22 which at least partially delimits a receptacle 23 for the at least one measuring tube of the measuring tube module and of a system. The measuring tube module 4 can be inserted into the receptacle 23 and is mechanically separable, i.e., can be connected in a positive or non-positive manner. The system which is particularly suitable for biotechnological applications has a housing with a housing wall, which is formed in particular from sheet metal and delimits a housing interior 77. Furthermore, the housing wall has a cover 78 with a continuous cover opening 79. The receptacle module 16 is arranged in this cover opening 79 such that a subregion of the receptacle module, in particular the receptacle 23, extends into the housing interior 77. The receptacle has a receiving longitudinal direction and a receiving direction into which the receptacle 23 extends, and which describes the orientation of the receptacle 23 and/or the receptacle module 16 in the system. The receiving direction points into the housing interior 77. The receptacle module 16 is arranged in the cover opening 79 in such a way that the receiving direction 115 has a vectorial portion with a direction opposite to the direction of gravity. Furthermore, the receptacle module 16 is arranged in the cover opening 79 in such a way that a dead volume in the at least one measuring tube 3 and/or in a distributor piece attached to the at least one measuring tube 3 when the measuring tube module 4 is emptied is less than 20%, in particular less than 10% and preferably less than 5%. In addition, the receptacle module 16 has a portion outside the housing interior 77 in which it has an in particular circumferential shoulder 81. The cover 78 has a cover surface 82 and the shoulder 81 has a shoulder surface 83. Both surfaces face one another, and an inclination body 116 is clamped between the shoulder surface 83 and the cover surface 82. It is wedge-shaped, and in particular acute-angled. According to the embodiment shown, the inclination body 116 in a longitudinal section assumes a basic shape of a particularly-rectangular trapezoid. The inclination body 116 also has a first lateral surface 117 in which a first lateral surface plane runs and a second lateral surface 118 in which a second lateral surface plane runs. Both lateral surface planes intersect at an angle α of 0.1° to 15, in particular 0.2° to 10° and preferably 0.5° to 7°. The inclination body 116 has an inclination body opening 119, the basic shape of which corresponds substantially to the outer basic shape of the receptacle module body 22—through which the receptacle module 116 extends at least partially in the installed state. The inclination body 116 is also designed as a sealing means for sealing the housing interior 77 against liquids. For this purpose, it can be formed from a plurality of sealing means which are suitable for use as a sealing means in bioprocessing applications. An advantageous sealing means is an EPDM building material.

The embodiment of FIG. 6B differs from the embodiment of FIG. 6A in that the inclination body 116 has an inclination body receptacle for a sealing means 120, which is arranged in the inclination body receptacle. In this case, the inclination body 116 is not designed as a sealing means. For example, an O-ring can be used as the sealing ring 120.

The embodiment of FIG. 6C differs substantially from the embodiment of FIG. 6B in that a disk-shaped sealing means 120 is arranged between the inclination body 116 and the cover surface 82. In this case, an inclination body receptacle is not absolutely necessary.

The embodiment of FIG. 6D substantially differs from the embodiment of FIG. 6A in that the shoulder surface 83 and the cover surface 82 face one another and run parallel to one another. In this case, a shoulder plane running on the shoulder surface 83 and an end face plane running on an end face 121 intersect at an angle β of 0.1° to 15°, in particular 0.2° to 10° and preferably 0.5° to 7°. The inclination body and the shoulder can be formed as a single piece or can be materially-bonded to one another.

The invention claimed is:

1. A process monitoring device, comprising:
   a measuring tube module comprising at least one measuring tube configured to enable a medium to flow therethrough;
   a receptacle module comprising a receptacle module body, which at least partially delimits a receptacle, wherein the measuring tube module is adapted to be introduced into the receptacle, and wherein the measuring tube module is releasably mechanically connectable to the receptacle module; and
   a system comprising a housing, wherein the housing includes a housing wall, which is made of sheet metal and delimits a housing interior,
   wherein the housing wall includes a cover, which includes a cover opening,
   wherein the receptacle module, in particular the receptacle, extends through the cover opening into the housing interior,
   wherein the receptacle extends in a receiving direction,
   wherein the receptacle module is arranged in the cover opening such that the receiving direction includes a vectorial component having a direction opposite to the direction of gravity,
   wherein the receptacle module is arranged in the cover opening such that a dead volume in the at least one measuring tube and/or in a distributor piece attached to the at least one measuring tube, when the measuring tube module is empty, is less than 20%,
   wherein the receptacle module includes a portion, which is outside the housing interior,
   wherein the receptacle module, in the portion, includes a circumferential shoulder, which includes a shoulder surface,
   wherein the cover includes a cover surface,
   wherein the shoulder surface and the cover surface face each other,
   wherein an inclination body is secured between the shoulder surface and the cover surface, and
   wherein the inclination body is wedge-shaped, including an acute angle.

2. The process monitoring device of claim 1, wherein the dead volume is less than 5%.

3. The process monitoring device of claim 1, wherein:
   the inclination body includes a first lateral surface in which a first lateral surface plane extends;

the inclination body includes a second lateral surface in which a second lateral surface plane extends;

the first lateral surface plane and the second lateral surface plane are at a first angle of 0.1° to 15°.

4. The process monitoring device of claim 3, wherein the first angle is 0.5° to 7°.

5. The process monitoring device of claim 1, wherein the inclination body includes an inclination body opening, wherein the receptacle module extends at least partially through the inclination body opening.

6. The process monitoring device of claim 1, wherein the inclination body is configured as a seal to enable sealing the housing interior against external liquids.

7. The process monitoring device of claim 6, wherein the inclination body is made of an EPDM material.

8. The process monitoring device of claim 1, wherein the inclination body includes an inclination body recess configured to accept seal, wherein the seal is disposed in the inclination body recess.

9. The process monitoring device of claim 1, wherein a disk-shaped seal is disposed between the inclination body and the cover surface.

10. The process monitoring device of claim 1, wherein the inclination body in a longitudinal section assumes a basic shape of a right trapezoid.

11. The process monitoring device of claim 1, wherein the inclination body has a rectangular basic shape, including a rectangular cutout defining the inclination opening.

12. The process monitoring device of claim 1, wherein the receptacle module comprises a fastening arrangement, which is disposed in the housing interior, wherein the fastening arrangement is configured to connect the receptacle module to the cover mechanically.

13. The process monitoring device of claim 1, wherein the system comprises a bioreactor or a subsystem configured for chromatographic purification processes.

14. The process monitoring device of claim 1, wherein:

the measuring tube module includes a first vibration exciting component of at least one vibration exciter, which is configured to excite vibrations in the at least one measuring tube of the measuring tube module;

the measuring tube module includes a first vibration sensor component of at least one vibration sensor, which is configured to detect the vibrations of the at least one measuring tube;

the receptacle module includes a second vibration exciting component of the at least one vibration exciter; and the receptacle module includes a second vibration sensor component of the at least one vibration sensor.

15. The process monitoring device of claim 1, wherein at least the measuring tube module and the receptacle module form a modular Coriolis flow measuring device.

16. A process monitoring device, comprising:

a measuring tube module comprising at least one measuring tube configured to enable a medium to flow therethrough;

a receptacle module comprising a receptacle module body, which at least partially delimits a receptacle, wherein the measuring tube module is adapted to be introduced into the receptacle, and wherein the measuring tube module is releasably mechanically connectable to the receptacle module; and a system comprising a housing, wherein the housing includes a housing wall, which is made of sheet metal and delimits a housing interior, wherein:

the housing wall includes a cover, which includes a cover opening;

the receptacle module, in particular the receptacle, extends through the cover opening into the housing interior;

the receptacle extends in a receiving direction;

the receptacle module is arranged in the cover opening such that the receiving direction includes a vectorial component having a direction opposite to the direction of gravity;

the receptacle module is arranged in the cover opening such that a dead volume in the at least one measuring tube and/or in a distributor piece attached to the at least one measuring tube, when the measuring tube module is empty, is less than 20%;

the receptacle module includes a portion, which is outside the housing interior;

the receptacle module, in the portion, includes a circumferential shoulder, which includes a shoulder surface;

the cover includes a cover surface;

the shoulder surface and the cover surface face each other and extend parallel to each other; and a shoulder plane extending along the shoulder surface and an end face plane extending along an end face intersect at a second angle of 0.1° to 15°.

17. The process monitoring device of claim 16, wherein the second angle is 0.5° to 7°.

18. The process monitoring device of claim 16, wherein the receptacle module comprises a fastening arrangement, which is disposed in the housing interior, wherein the fastening arrangement is configured to connect the receptacle module to the cover mechanically.

19. The process monitoring device of claim 16, wherein the system comprises a bioreactor or a subsystem configured for chromatographic purification processes.

20. The process monitoring device of claim 16, wherein:

the measuring tube module includes a first vibration exciting component of at least one vibration exciter, which is configured to excite vibrations in the at least one measuring tube of the measuring tube module;

the measuring tube module includes a first vibration sensor component of at least one vibration sensor, which is configured to detect the vibrations of the at least one measuring tube;

the receptacle module includes a second vibration exciting component of the at least one vibration exciter; and the receptacle module includes a second vibration sensor component of the at least one vibration sensor.

21. The process monitoring device of claim 16, wherein at least the measuring tube module and the receptacle module form a modular Coriolis flow measuring device.

* * * * *